United States Patent
Doddy

[11] Patent Number: 5,823,658
[45] Date of Patent: Oct. 20, 1998

[54] ANCHORABLE FLASHLIGHT SUPPORT

[76] Inventor: Patrick P. Doddy, 938 W. Central Ave., Alpha, N.J. 08865

[21] Appl. No.: 950,816

[22] Filed: Oct. 15, 1997

[51] Int. Cl.⁶ ..................................................... F21V 15/20
[52] U.S. Cl. ........................... 362/191; 362/396; 362/430
[58] Field of Search ................................... 362/190, 191, 362/396, 418, 430

[56] References Cited

U.S. PATENT DOCUMENTS

| | | | |
|---|---|---|---|
| 2,470,645 | 5/1949 | Reichart | 99/421 |
| 3,992,618 | 11/1976 | Matthews et al. | 240/52 |
| 4,506,317 | 3/1985 | Duddy | 362/396 |
| 4,799,132 | 1/1989 | Perlsweig | 362/118 |
| 4,895,329 | 1/1990 | Sloan | 248/229 |
| 4,897,768 | 1/1990 | Thue | 362/191 |
| 5,103,384 | 4/1992 | Drohan | 362/191 |
| 5,163,752 | 11/1992 | Copeland et al. | 362/396 |
| 5,257,169 | 10/1993 | Walendziak | 362/92 |
| 5,276,596 | 1/1994 | Krenzel | 362/191 |

Primary Examiner—Stephen F. Husar
Attorney, Agent, or Firm—Joseph N. Breaux

[57] ABSTRACT

An anchorable flashlight support that includes a pivoting flashlight securing ring; an anchor bracket assembly having a support arm brace member, a clamping brace member and a ledge receiving bend assembly having a pair of parallel members connected by a right angle attachment member that form a ledge receiving slot; a flexible metal support arm connected between the flashlight securing ring and the support arm brace member of the anchor bracket assembly; and a screw down clamp assembly having a threaded rod threaded through the clamping brace member of the anchor bracket assembly and a clamping contact that is swivel mounted to an end of the threaded rod and that is positioned outside of the ledge receiving slot formed by the ledge receiving bend assembly of the anchor bracket assembly; a lower end of the support arm brace member being integrally formed with an insertion end of one of the parallel members of the ledge receiving bend assembly; an upper end of the support arm brace member being integrally formed with a connecting end of the clamping brace member; the support arm brace member being oriented at a right angle with respect to the pair of parallel members; the clamping brace member being oriented in parallel with the pair of parallel members.

16 Claims, 2 Drawing Sheets

ANCHORABLE FLASHLIGHT SUPPORT

TECHNICAL FIELD

The present invention relates to portable illuminating device supports and more particularly to an anchorable flashlight support that includes a pivoting flashlight securing ring; an anchor bracket assembly having a support arm brace member, a clamping brace member and a ledge receiving bend assembly having a pair of parallel members connected by a right angle attachment member that form a ledge receiving slot; a flexible metal support arm connected between the flashlight securing ring and the support arm brace member of the anchor bracket assembly; and a screw down clamp assembly having a threaded rod threaded through the clamping brace member of the anchor bracket assembly and a clamping contact that is swivel mounted to an end of the threaded rod and that is positioned outside of the ledge receiving slot formed by the ledge receiving bend assembly of the anchor bracket assembly; a lower end of the support arm brace member being integrally formed with an insertion end of one of the parallel members of the ledge receiving bend assembly; an upper end of the support arm brace member being integrally formed with a connecting end of the clamping brace member; the support arm brace member being oriented at a right angle with respect to the pair of parallel members; the clamping brace member being oriented in parallel with the pair of parallel members.

BACKGROUND ART

It is often desirable to grill or bar-b-que later in the evening when the outside temperature is normally cooler. Although the temperature is cooler in the evening, if the cooking begins too late it can become dark before the cooking is finished, requiring the cook to finish cooking beneath an artificial light source, such as a flashlight. Although an artificial light source allows the cook to safely complete the bar-b-que or grilling, such light sources are often unwieldy and difficult to hold while cooking. It would be a benefit in such a situation to have an anchorable flashlight support that could be anchored to the grill to support a flashlight in a user selected position and allow the cook to use both hands without the need for holding and aiming a flashlight. Because many grills provide small ledges that can be difficult to attach a clamp to, it would be further benefit to have an anchorable flashlight support that includes an anchor bracket assembly having a ledge receiving bend assembly having a pair of parallel members connected by a right angle attachment member that form a ledge receiving slot into which a section of the grill ledge can be inserted and a screw down clamp assembly having a threaded rod and a clamping contact that is tightened to contact a portion of the grill in a manner to cause the ledge receiving bend assembly to twist squeezing the section of the grill ledge inserted into the ledge receiving slot between the parallel members.

GENERAL SUMMARY DISCUSSION OF INVENTION

It is thus an object of the invention to provide an anchorable flashlight support that includes a clamp securable to or near a grill for supporting a flashlight in a user selected position.

It is a further object of the invention to provide an anchorable flashlight support that includes an anchor bracket assembly having a ledge receiving bend assembly having a pair of parallel members connected by a right angle attachment member that form a ledge receiving slot into which a section of the grill ledge of a cooking grill can be inserted and a screw down clamp assembly having a threaded rod and a clamping contact that is tightened to contact a portion of the grill in a manner to cause the ledge receiving bend assembly to twist in a manner to squeeze the section of the grill ledge inserted into the ledge receiving slot between the parallel members.

It is a still further object of the invention to provide an anchorable flashlight support that includes a pivoting flashlight securing ring; an anchor bracket assembly having a support arm brace member, a clamping brace member and a ledge receiving bend assembly having a pair of parallel members connected by a right angle attachment member that form a ledge receiving slot; a flexible metal support arm connected between the flashlight securing ring and the support arm brace member of the anchor bracket assembly; and a screw down clamp assembly having a threaded rod threaded through the clamping brace member of the anchor bracket assembly and a clamping contact that is swivel mounted to an end of the threaded rod and that is positioned outside of the ledge receiving slot formed by the ledge receiving bend assembly of the anchor bracket assembly; a lower end of the support arm brace member being integrally formed with an insertion end of one of the parallel members of the ledge receiving bend assembly; an upper end of the support arm brace member being integrally formed with a connecting end of the clamping brace member; the support arm brace member being oriented at a right angle with respect to the pair of parallel members; the clamping brace member being oriented in parallel with the pair of parallel members.

It is a still further object of the invention to provide an anchorable flashlight support that accomplishes some or all of the above objects in combination.

Accordingly, an anchorable flashlight support is provided. The anchorable flashlight support that includes a pivoting flashlight securing ring; an anchor bracket assembly having a support arm brace member, a clamping brace member and a ledge receiving bend assembly having a pair of parallel members connected by a right angle attachment member that form a ledge receiving slot; a flexible metal support arm connected between the flashlight securing ring and the support arm brace member of the anchor bracket assembly; and a screw down clamp assembly having a threaded rod threaded through the clamping brace member of the anchor bracket assembly and a clamping contact that is swivel mounted to an end of the threaded rod and that is positioned outside of the ledge receiving slot formed by the ledge receiving bend assembly of the anchor bracket assembly; a lower end of the support arm brace member being integrally formed with an insertion end of one of the parallel members of the ledge receiving bend assembly; an upper end of the support arm brace member being integrally formed with a connecting end of the clamping brace member; the support arm brace member being oriented at a right angle with respect to the pair of parallel members; the clamping brace member being oriented in parallel with the pair of parallel members.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
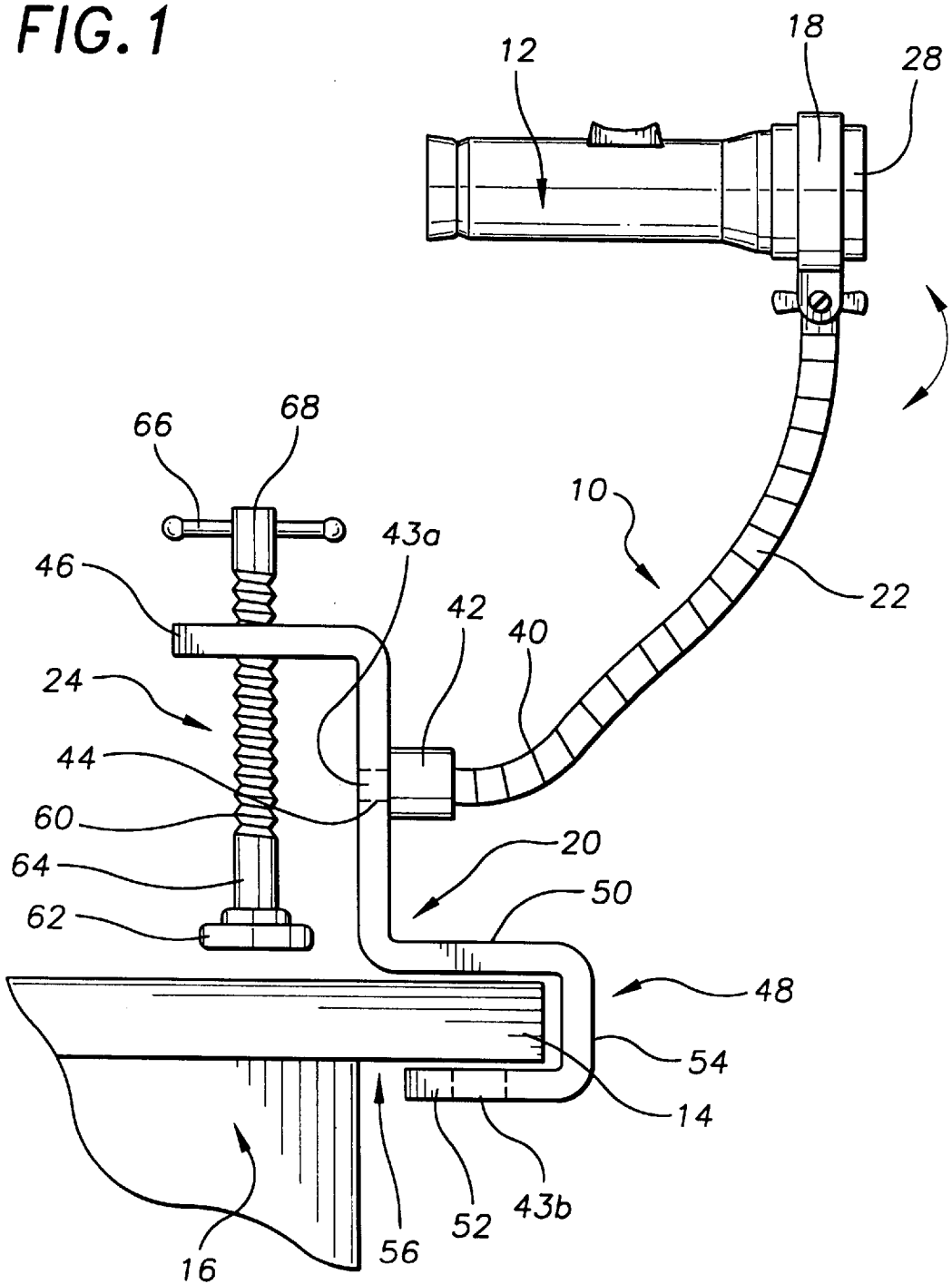
FIG. 1 is a plan view of an exemplary embodiment of the anchorable flashlight support of the present invention, a representative flashlight and an edge portion of a conventional outdoor grill that shows the lens portion of the flashlight mounted within the pivoting flashlight securing ring, the flexible metal support arm connected between the flashlight securing ring and support arm brace member of the anchor bracket assembly; the edge portion of the outdoor grill positioned into the ledge receiving slot formed by the ledge receiving bend assembly of the anchor bracket assembly; and the threaded rod of the screw down clamp assembly threaded through the clamping brace member of the anchor bracket assembly with the clamping contact positioned above the edge portion of the outdoor grill and outside of the ledge receiving slot of the ledge receiving bend assembly.

FIG. 1 shows an exemplary embodiment of the anchorable flashlight support of the present invention, generally designated by the numeral 10; along with a representative flashlight, generally designated 12; and an edge portion 14 of a conventional outdoor grill, generally designated 16. In this embodiment, anchorable flashlight support 10 includes a pivoting flashlight securing ring 18; an anchor bracket assembly, generally designated 20; a flexible metal support arm 22; and a screw down clamp assembly, generally designated 24.

Figure 2:
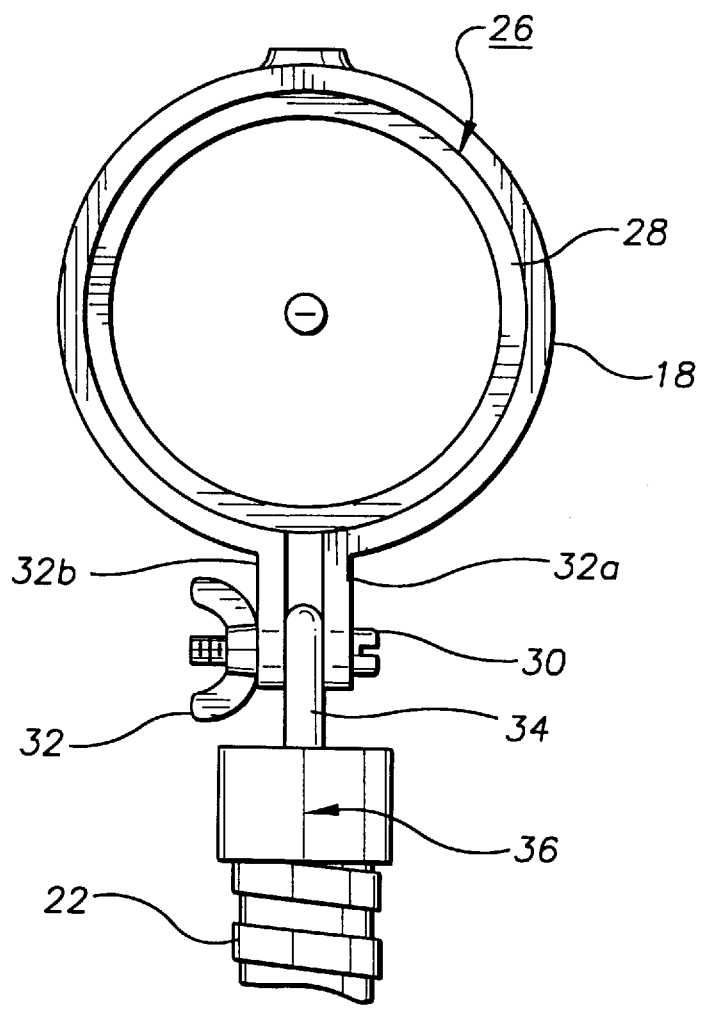
FIG. 2 is a detail plan view showing the flashlight mounted within the pivoting flashlight securing ring and the pivoting securing ring pivotally mounted the securing ring connecting flange of the flexible metal support arm with a wing-nut and bolt fastener.

With reference to FIG. 2, pivoting flashlight securing ring 18 is constructed of metal and includes a tubular clamping opening 26 within which the lens portion 28 (also shown in FIG. 1) is positioned and clamped in place by tightening a bolt 30 and a wing nut 32 that are positioned through two ring extensions 32a, 32b and the center extension 34 of a molded plastic securing ring connecting flange, generally designated 36, that is adhesively secured to an upper end of flexible metal support arm 22.

Figure 1A:
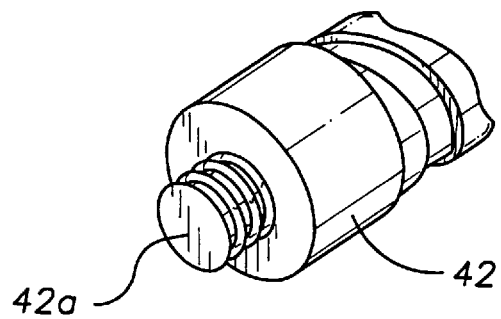
FIG. 1A is a detail perspective view showing the threaded end of the metal mounting fixture.

With reference back to FIG. 1, the other end 40 of flexible metal support arm 22 is rigidly attached to a metal mounting fixture 42 having a threaded end 42a (FIG. 1A) that is threaded into one of two companionately threaded apertures 43a, 43b that are formed, respectively, through a metal support arm brace member 44 and a second parallel member 52 that form portions of anchor bracket assembly 20. In this embodiment, anchor bracket assembly 20 is constructed from a single length of two inch wide, one-quarter inch thick, steel rod stock that has been bent to form support arm brace member 44, a clamping brace member 46 and a ledge receiving bend assembly, generally designated 48, that has a first parallel member 50, second parallel member 52 and a right angle attachment member 54. First parallel member 50, second parallel member 52 and right angle attachment member 54 form a ledge receiving slot 56 into which a portion, such as edge portion 14, of conventional outdoor grill 16 is inserted when attaching anchor bracket assembly 20 to grill 16. Support arm brace member 44 is oriented at a right angle with respect to first and second parallel members 50, 52. Clamping brace member 46 is oriented in parallel with first and second parallel members 50, 52. Use of two threaded apertures 43a, 43b allows the use to attach metal mounting fixture 42 to the most convenient portion of anchor bracket assembly 20 for a particular installation. In addition, the unused threaded aperture 43a, 43b can be used for a mounting bolt should a permanent installation be desired.

Screw down clamp assembly 24 includes a threaded steel rod 60 that is threaded through clamping brace member 46 and that has a clamping contact 62 that is swivel mounted to a first end 64 thereof and a T-handle 66 that is secured at a top end 68 thereof. T-handle 66 is used to rotate threaded rod 60 and force clamping contact 62 against a portion of the grill 16. As clamping contact 62 is forced against grill 16, a force is generated that causes ledge receiving bend assembly 48 to twist and squeeze grill ledge portion 14 between first and second parallel members 50, 52.

It can be seen from the preceding description that an anchorable flashlight support has been provided that includes a clamp securable to or near a grill for supporting a flashlight in a user selected position; that includes an anchor bracket assembly having a ledge receiving bend assembly having a pair of parallel members connected by a right angle attachment member that form a ledge receiving slot into which a section of the grill ledge of a cooking grill can be inserted and a screw down clamp assembly having a threaded rod and a clamping contact that is tightened to contact a portion of the grill in a manner to cause the ledge receiving bend assembly to twist in a manner to squeeze the section of the grill ledge inserted into the ledge receiving slot between the parallel members; and that includes a pivoting flashlight securing ring; an anchor bracket assembly having a support arm brace member, a clamping brace member and a ledge receiving bend assembly having a pair of parallel members connected by a right angle attachment member that form a ledge receiving slot; a flexible metal support arm connected between the flashlight securing ring and the support arm brace member of the anchor bracket assembly; and a screw down clamp assembly having a threaded rod threaded through the clamping brace member of the anchor bracket assembly and a clamping contact that is swivel mounted to an end of the threaded rod and that is positioned outside of the ledge receiving slot formed by the ledge receiving bend assembly of the anchor bracket assembly; a lower end of the support arm brace member being integrally formed with an insertion end of one of the parallel members of the ledge receiving bend assembly; an upper end of the support arm brace member being integrally formed with a connecting end of the clamping brace member; the support arm brace member being oriented at a right angle with respect to the pair of parallel members; the clamping brace member being oriented in parallel with the pair of parallel members.

It is noted that the embodiment of the anchorable flashlight support described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An anchorable flashlight support comprising:

a pivoting flashlight securing ring;

an anchor bracket assembly having a support arm brace member, a clamping brace member and a ledge receiving bend assembly having a pair of parallel members connected by a right angle attachment member that form a ledge receiving slot;

a flexible metal support arm connected between said flashlight securing ring and said anchor bracket assembly; and a screw down clamp assembly having a threaded rod threadable through said clamping brace member of said anchor bracket assembly and a clamping contact that is swivel mounted to an end of said threaded rod and that is positioned outside of said ledge receiving slot formed by said ledge receiving bend assembly of said anchor bracket assembly.

2. The anchorable flashlight support of claim 1, wherein:
said clamping brace member is oriented in parallel with said pair of parallel members.

3. The anchorable flashlight support of claim 1, wherein:
said support arm brace member is oriented at a right angle with respect to said pair of parallel members.

4. The anchorable flashlight support of claim 1 wherein:
an upper end of said support arm brace member is integrally formed with a connecting end of said clamping brace member.

5. The anchorable flashlight support of claim 1 wherein:
a lower end of said support arm brace member is integrally formed with an insertion end of one of said parallel members of said ledge receiving bend assembly.

6. The anchorable flashlight support of claim 2, wherein:
said support arm brace member is oriented at a right angle with respect to said pair of parallel members.

7. The anchorable flashlight support of claim 2 wherein:
an upper end of said support arm brace member is integrally formed with a connecting end of said clamping brace member.

8. The anchorable flashlight support of claim 2 wherein:
a lower end of said support arm brace member is integrally formed with an insertion end of one of said parallel members of said ledge receiving bend assembly.

9. The anchorable flashlight support of claim 6 wherein:
an upper end of said support arm brace member is integrally formed with a connecting end of said clamping brace member.

10. The anchorable flashlight support of claim 6 wherein:
a lower end of said support arm brace member is integrally formed with an insertion end of one of said parallel members of said ledge receiving bend assembly.

11. The anchorable flashlight support of claim 9 wherein:
a lower end of said support arm brace member is integrally formed with an insertion end of one of said parallel members of said ledge receiving bend assembly.

12. The anchorable flashlight support of claim 7 wherein:
a lower end of said support arm brace member is integrally formed with an insertion end of one of said parallel members of said ledge receiving bend assembly.

13. The anchorable flashlight support of claim 3 wherein:
an upper end of said support arm brace member is integrally formed with a connecting end of said clamping brace member.

14. The anchorable flashlight support of claim 3 wherein:
a lower end of said support arm brace member is integrally formed with an insertion end of one of said parallel members of said ledge receiving bend assembly.

15. The anchorable flashlight support of claim 13 wherein:
a lower end of said support arm brace member is integrally formed with an insertion end of one of said parallel members of said ledge receiving bend assembly.

16. The anchorable flashlight support of claim 4 wherein:
a lower end of said support arm brace member is integrally formed with an insertion end of one of said parallel members of said ledge receiving bend assembly.

* * * * *